(12) United States Patent
Nitsch

(10) Patent No.: US 11,930,558 B2
(45) Date of Patent: Mar. 12, 2024

(54) METHOD FOR PROVIDING SUBSCRIPTION PROFILES, SUBSCRIBER IDENTITY MODULE AND SUBSCRIPTION SERVER

(71) Applicant: GIESECKE+DEVRIENT MOBILE SECURITY GMBH, Munich (DE)

(72) Inventor: Nils Nitsch, Markt Schwaben (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 357 days.

(21) Appl. No.: 17/439,111

(22) PCT Filed: Mar. 12, 2020

(86) PCT No.: PCT/EP2020/025130
§ 371 (c)(1),
(2) Date: Sep. 14, 2021

(87) PCT Pub. No.: WO2020/187450
PCT Pub. Date: Sep. 24, 2020

(65) Prior Publication Data
US 2022/0150686 A1 May 12, 2022

(30) Foreign Application Priority Data
Mar. 15, 2019 (DE) ...................... 10 2019 001 840.0

(51) Int. Cl.
*H04W 8/18* (2009.01)
*H04W 8/20* (2009.01)
(52) U.S. Cl.
CPC .......... *H04W 8/183* (2013.01); *H04W 8/205* (2013.01)
(58) Field of Classification Search
CPC ..... H04W 8/183; H04W 8/205; H04W 12/04; H04W 12/08; H04W 12/35
(Continued)

(56) References Cited

U.S. PATENT DOCUMENTS 9,439,076 B2 9/2016 Rudolph
9,451,461 B2 9/2016 Hartel et al.
(Continued)

FOREIGN PATENT DOCUMENTS

DE 102012018540 A1 3/2014
DE 102012020690 A1 4/2014
(Continued)

OTHER PUBLICATIONS

International Search Report with Written Opinion from PCT Application No. PCT/EP2020/025130, dated Jun. 16, 2020.
(Continued)

*Primary Examiner* — Eugene Yun
(74) *Attorney, Agent, or Firm* — Workman Nydegger

(57) ABSTRACT

The invention relates to a method for providing subscription profiles to a subscriber identity module, preferably an eUICC, by means of a subscription server, preferably an SM-DP, wherein: the subscription server has knowledge of a first subscription profile, which is installed in the subscriber identity module, has a first profile file structure and first profile data stored in the first profile file structure; and at least a portion of a second profile file structure of a second subscription profile is flagged in the subscription server and the second subscription profile is sent to the subscriber identity module, the flagged portion of the second subscription profile being sent without second profile data. The invention additionally relates to a corresponding method in a subscriber identity module, a subscriber identity module, a subscription server and a computer program product.

15 Claims, 5 Drawing Sheets

(58) Field of Classification Search
USPC .......................................................... 455/558
See application file for complete search history.

(56) References Cited

U.S. PATENT DOCUMENTS

| | | | |
|---|---|---|---|
| 10,904,742 | B2 | 1/2021 | Nitsch et al. |
| 2015/0281957 | A1 | 10/2015 | Hartel et al. |
| 2015/0289140 | A1 | 10/2015 | Rudolph |
| 2016/0021529 | A1 | 1/2016 | Park et al. |
| 2018/0167805 | A1 | 6/2018 | Perlick |
| 2018/0317083 | A1 | 11/2018 | Nitsch et al. |
| 2019/0268755 | A1* | 8/2019 | Namiranian .......... H04W 8/183 |

FOREIGN PATENT DOCUMENTS

| | | | | |
|---|---|---|---|---|
| DE | 102014019089 A1 | 6/2016 | | |
| DE | 102015008179 A1 | 12/2016 | | |
| EP | 2802162 A1 | 11/2014 | | |
| EP | 3457671 A1 * | 3/2019 | ............. | H04L 67/34 |
| WO | 2016128141 A1 | 8/2016 | | |
| WO | 2016193414 A1 | 12/2016 | | |

OTHER PUBLICATIONS

German Office Action from corresponding Application No. DE 102019001840.0, dated Sep. 24, 2019.

Lucent Technologies: "Subscription Management—Create User," 3GPP TSG-SA5, (Telecom Management), Meeting #34bis, Chapter 2.3, Steps 4/5, Jul. 10-18, 2003, 6 pages.

* cited by examiner

Fig.1 — Prior Art

METHOD FOR PROVIDING SUBSCRIPTION PROFILES, SUBSCRIBER IDENTITY MODULE AND SUBSCRIPTION SERVER

TECHNICAL FIELD OF THE INVENTION

The invention relates to a method for providing subscription profiles to a subscriber identity module, preferably an eUICC, by means of a subscription server, preferably an SM-DP, as well as to a method for managing subscription profiles in a subscriber identity module, a corresponding subscriber identity module, a corresponding subscription server, and a computer program product.

For the use of services of a communication network, a terminal, for example a mobile telephone or a Machine-to-Machine module, short M2M module, contains a subscriber identity module. At least one subscription profile, in the following also referred to in simplified form as profile, is contained in the subscriber identity module. The profile comprises subscriber identity data to identify and authenticate a subscriber on the communication network, for example a mobile network. This profile makes it possible for an operator of the communication network to unambiguously assign the use of a service offered, for example a voice and/or data service, to each subscriber in the communication network. Furthermore, it is possible for the operator to enable network access, that is to say the login into the communication network, as soon as authentication of the subscriber has taken place. He can also deny network access if authentication of the subscriber is not possible.

TECHNICAL BACKGROUND

Current subscriber identity modules are set up to receive, set up, use, update, activate, deactivate, delete, and/or extend a profile even after their manufacture. This is commonly referred to as subscriber identity management or also subscription management. A subscriber identity module can have several different profiles.

Changes to a profile thereby require the provision of a complete profile. In conventional plug-in SIM cards, the profile change could be performed simply by exchanging the SIM card in the terminal. Alternatively, a new profile is set up in the subscriber identity module, which is performed particularly in subscriber identity modules, which cannot easily be exchanged in the terminal. When a profile is set up in an eUICC, a profile file structure is created in the subscriber identity module and profile data are loaded into this profile file structure in a subsequent step and installed there.

The technical GSMA specifications "12FAST.13-Embedded SIM Remote Provisioning Architecture 17 Dec. 2013"—in the following referred to as technical specification [1]- and "SGP02 Remote Provisioning Architecture for Embedded UICC Technical Specification V2.0, 13 Oct. 2014"—in the following referred to as technical specification [2]—describe such a management of subscriptions. The technical specification [1] describes thereby the tasks and functions by means of which a profile is loaded from a subscription server into an eUICC and installed there. The technical specification [2] describes the protocolar procedure in downloading and installing a subscription profile into an eUICC. FIG. 1 shows in simplified form a system for managing profiles or subscriber identity modules according to the technical specifications [1] and [2]. Aspects relating to downloading and installing subscriptions in eUICCs are also disclosed in technical specifications [3] GSMA SGP.22—RSP Technical Specification, version 2.2, 1 Sep. 2017, and [4] GSMA SGP.21—RSP Architecture, Version 2, 1 Sep. 2017.

Activating a profile, deactivating a profile, deleting a profile, creating a profile, changing from a first profile to a second profile and/or updating an existing profile is required, for example, at a time at which the subscriber identity module has already been delivered to a subscriber and a profile is used for using services of a communication network. Moreover, at a time after delivery/manufacture of the subscriber identity module, the subscriber could desire to use further services of the communication network or another communication network. Such operations cannot be prepared during personalization in the manufacture of subscriber identity modules.

A solution for managing subscription profiles is desirable, in which the amount of data transmitted to the subscriber identity module, in particular the data transmitted in addition to the actual profile data of a profile, is greatly reduced.

DE 10 201 2 018 540 A1 discloses for this a subscriber identity module with two identical profiles, in which always only one may be active. Thus, a subscription change can be performed largely without OTA transmission of data. However, different profiles cannot be operated here.

EP 2 802 162 A1 describes a SIM card in which a profile template is permanently introduced. Profile structures can be generated from this profile template by means of a command transmitted from a server to the SIM card. These profile structures can be filled in with profile data in a second step. This profile template permanently requires memory space in the SIM card. This storage space is then no longer available for profiles.

DE 10 201 2 020 690 A1 describes an eUICC in which different profiles are stored. Subscriber identity data are activated by means of a remote management using a charging command in that a link is rewritten to a file. In this case, the file always remains at its memory location, as a result of which memory accesses can be reduced. Only the retrieval of the file changes. Here too, a permanently introduced profile template is required.

WO 2016/128 141 A1 describes an eUICC with a local cloning function. The local cloning function of the eUICC copies a profile file structure of an existing first profile and stores it as a second profile file structure in the eUICC. Second profile data are recorded into this second profile file structure in a subsequent step to set up a second profile.

WO 2016/193414 A1 describes a method for transmitting parameter data between a telecommunication network and a telecommunication terminal and for activating and/or changing and/or deactivating a communication profile defined by the parameter data on the telecommunication terminal. The telecommunication terminal comprises an eUICC module, wherein the eUICC module provides the functions of an embedded universal integrated circuit card (eUICC), wherein by means of the eUICC module the parameter data for using the telecommunication network according to the communication profile is stored in a memory area assigned to the eUICC module, wherein the communication profile is assigned both to a network operator of the telecommunication network and to the telecommunication terminal or to a user of the telecommunication terminal, wherein the following steps are performed for transmitting the parameter data to the telecommunication terminal and for activating and/or changing and/or deactivating the communication profile in the eUICC module of the telecommunication terminal. In a first step, the parameter data is transmitted from the telecommunications network to the telecommunications terminal, with a MIME type information (Multipurpose Internet Mail Extensions type information) being associated with the profile data. In a second step following the first step, a MIME handler application of the telecommunications terminal is activated—based on the MIME type information—in such a way that the parameter data is used to activate and/or change and/or deactivate the communication profile in the telecommunications terminal in that the MIME handler application has at least partial access to the eUICC module and brings about a change and/or addition to the content of the memory area assigned to the eUICC module Sometimes, two profiles differ only slightly when a first profile is to be replaced by a second subscription profile. For example, only individual parameters or data (in the following referred to as parts of profile data) of the second profile may be different from individual parameters or data of the first profile, whereas all other parameters or data of the first profile are completely identical to the profile data of the second profile. Nevertheless, until now, a complete profile must always be downloaded.

Sometimes, an existing active profile is to be extended only by a further functionality or to be converted to a more current version. Until now, the complete profile must always be newly created and set up (loaded and installed). This causes a high data volume in the communication network. In addition, at least parts of the profile data and, optionally, the profile file structure needs to be new negotiated between two system components of the system shown in FIG. 1 (outside of the subscriber identity module), for example OTA keys or other subscriber identity data. This negotiation causes additional data volume in the communication network.

SUMMARY OF THE INVENTION

The object of the invention is to provide a subscriber identity module or a method, which allows a provision and management of subscription profiles in the subscriber identity module with an even smaller amount of data to be transmitted to the subscriber identity module in the communication network.

The object is achieved by a subscriber identity module according to any one of the preceding claims. Advantageous embodiments of the invention are indicated in the dependent claims.

According to the invention, a method for providing subscription profiles to a subscriber identity module, preferably an eUICC, by means of a subscription server, preferably an SM-DP, is provided. The subscription server has knowledge of a first subscription profile installed in the subscriber identity module and including a first profile file structure and first profile data stored in the first profile file structure. The following method steps run in the subscription server: marking at least a part of a second profile file structure of a second subscription profile; and transmitting the second subscription profile to the subscriber identity module, wherein the marked part of the second subscription profile is transmitted without second profile data, wherein in the transmitting step those first profile data of the first subscription profile, which are to be copied, are indicated to be stored as second profile data in the marked part of the second profile file structure of the second subscription profile.

A subscriber identity module in the sense of the invention is an electronic module, which is reduced in size and resource scope, and which includes a microcontroller and at least one data interface for communication with the terminal. This subscriber identity module includes a secure memory area in which subscriber identity data are reliably introduced to prevent manipulation and/or misuse attempts during identification and/or authentication on the network. The subscriber identity module can be operated by means of a terminal, wherein the module is self-sufficient except for supply signals, such as supply voltage, clock, reset, etc.

The subscriber identity module is, for example, a chip card, also referred to as Universal Integrated Circuit Card, short UICC, or SIM card. The subscriber identity module is used to identify a subscriber in a communication network with the machine-readable subscriber identity data stored in the secure memory area and to authenticate this subscriber for the use of services.

Alternatively, the subscriber identity module is an integral component within the terminal, for example, as a hard-wired electronic component. Such subscriber identity modules are also referred to as embedded UICC (eUICC). In this design, these subscriber identity modules are not intended for removal from the terminal and can in principle not be easily replaced. Such Subscriber identity modules can also be designed as embedded secure elements, thus as a secure hardware component in the terminal.

Alternatively, the subscriber identity module is a Machine-to-Machine, short M2M, module. These modules are used for remote monitoring, control, and maintenance of terminals, such as machines, facilities, and systems. Alternatively, they can also be used for counting units, such as electricity meters, hot water meters, etc.

Alternatively, the subscriber identity module is designed as a software component in a trusted part of an operating system, a so-called trusted execution environment, short TEE, of the terminal. The subscriber identity module is then designed, for example, within a secured runtime environment in the form of programs running therein, so-called "trustlets".

Subscriber identity data in the sense of the invention are, for example, data, which uniquely identify a subscriber in the communication network. This includes, for example, a subscriber identifier, also International Mobile Subscriber Identity, short IMSI, and/or subscriber-specific data. The IMSI is the subscriber identity file which is unique in a mobile network. It is composed of the country code MCC (Mobile Country Code), the network code MNC (Mobile Network Code) and a current number, which is issued by the network operator.

In addition, subscriber identity data are, for example, data, which uniquely authenticate a subscriber on the communication network, for example, an authentication algorithm, specific algorithm parameters, a cryptographic authentication key Ki and/or a cryptographic Over The Air, short OTA, key.

A communication network in the sense of the invention is a technical device on which the transmission of signals takes place with identification and/or authentication of the subscriber, as a result of which services are offered. The communication network is preferably a mobile network. A device-to-device communication with regard to the communication network is also conceivable. In particular, a mobile network is understood here as the "Global System for Mobile Communications", short GSM, as a representative of the second generation, or the "General Packet Radio Service", short GPRS, or "Universal Mobile Telecommunications System", short UMTS, as a representative of the third generation, the "Long Term Evolution", short LTE, as a representative of the fourth generation, as a mobile network, or as a mobile network of the 5th generation with the current work title "5G" as a communication network.

A service is, in particular, a voice service or a data service, by means of which information and/or data are transmitted via the communication network.

A subscription server is a component that is part of or in communication with part of the communication network to manage subscriber identity modules, for example, to create ("create profiles"), to set up ("profile download and installation"), to activate ("enable profiles"), to deactivate ("disable profiles") and/or to delete ("delete profiles") different profiles. The subscription server is, for example, divided into server components, such as a subscription managing secure routing, SM-SR, server component, and a subscription managing data preparation, SM-DP, server component, or is a combined SM-DP+ server according to specification [3] SGP.21 or [4] SGP.22, which includes SM-SR and SM-DP in the single server SM-DP+, wherein the method according to the invention is preferably performed using an SM-DP or SM-DP part of the SM-DP+. Communication between subscription server and eUICC preferably takes place via a secure channel, for example SCP80 and SCP81, as defined in ETSI 102 225 and/or ETSI 102 226.

The subscriber identity module according to the invention includes at least the first profile with a first file structure and first profile data installed therein. The subscriber identity module can already include further different profiles. Installed first profile data are, in particular, profile data which are completely set up on the subscriber identity module. Thus, during a "download and installation" procedure according to technical specifications [1] or [2], the subscription server has received a "download complete" message as confirmation, or a notification according to [4] SGP.22, chapter 3.5, that the first profile is set up and can include all states of a life cycle of a profile in the subscription management.

A file structure in the sense of the application is in particular a structured profile-based security domain, for example an ISD-P according to the technical specifications [1] or/and [2] or [3] or [4]. A profile file structure and profile data to be filed therein are unambiguously assigned to each profile of a subscriber identity module. A profile is preferably unambiguously assigned to a subscriber identity module, so-called "profile binding package". A multiple profiles with different profile file structures and different profile data filed therein can exist next to one another on a subscriber identity module. The set up of a profile file structure is possible only by means of a subscription server, which has corresponding access rights for such a setup by means of a subscriber identity module-based security area, which is superior to the profile file structures, for example an ISD-R according to the technical specifications [1], [2], [3], [4]. When a new (second) profile file structure may be created on the subscriber identity module, for example for communication via another (additional) communication network or the same network by using other service, such a file structure (ISD-P) can be created with the aid of the subscription server within the framework of a "create profile" procedure.

Each of the profiles set up in the subscriber identity module has its own file structure with profile data installed therein. These profile data permit the establishment, operation and termination of a connection of the terminal in the communication network. The profile data of a profile are, in particular, data, which can uniquely identify and authenticate a subscriber on the communication network, for example an authentication algorithm, specific algorithm parameters, a cryptographic authentication key Ki, a cryptographic Over The Air (OTA) key, a subscriber identifier, IMSI; a subscriber identity module identifier, ICCID. The profile data can also be applications, which are unambiguously assigned to this profile, for example, an authentication application, a signing application, or an encryption application.

In particular, first profile data are installed in a first profile file structure of a first profile. According to the invention, a part of this first profile data can be installed in a second file structure of a second profile (also referred to below as copying and storing). Thus, this part of the first profile data is further used as part of the second profile data. As a result of the further use of this part of the profile data, a data volume in the communication network can be reduced, since on the one hand this part of the profile data does not have to be transported (transmitted) from the server to the subscriber identity module and, on the other hand, this part of the second profile data does not have to be negotiated or generated between different system components in the system according to FIG. 1.

The profile data include, for example, at least one file (Directory File, DF) and at least one elementary file (Elementary File, EF). In these DF and EF, the authentication algorithm, specific algorithm parameters, Ki, OTA key, IMSI, ICCID may be accommodated. Also, instead of in DFs and EFs, the authentication algorithm, the specific algorithm parameters, the Ki, the OTA key, the IMSI, the ICCID, etc. may be stored alternatively without file system structure as objects or otherwise in the memory.

Preferably, a subset of the entire second profile file structure of a second profile is indicated as a part (to be marked or marked) of a profile file structure. This part can in turn comprise the entirety or even only a subset of an entire first profile file structure of a first profile. For example, the second profile comprises the entirety of the profile file structure of the first profile (already installed in the subscriber identity module) and, additionally, also functional extensions or updates. According to the invention, the already installed part of a first profile is not transmitted during the transmission of the second profile but is copied locally from the first profile in the subscriber identity module.

Thus, the marking takes place for a part of the second profile file structure, in which second profile data would normally be set up. Since, according to knowledge of the server, these second profile data are already present in the first profile file structure as first profile data in the first profile of the subscriber identity module, retransmission to the subscriber identity module can be omitted. It is thus possible to continue using already installed profile data without having to be provided again by the server and/or without having to be negotiated between system components. This reduces the data volume when a new profile is provided. In addition, the effort for synchronizing structures to be synchronized is reduced. Structures to be updated are, for example, counters, such as the OTA counter, which counts the number of OTA dial-ins by the subscriber identity module, and the authentication counter, which counts the number of authentications that have already been performed by the subscriber identity module. In addition, a user can, for example, take his PIN with him, with which access to the subscriber identity module is restricted, in particular a possibly changed PIN.

The marked part of the second file structure relates to first profile data for the second profile which are already installed in the subscriber identity module. These first profile data may be installed in one or more set up profiles of the subscriber identity module.

The second profile file structure of the second profile will be correspondingly marked. For example, an indication as the marking is introduced into the second profile file structure instead of the second profile file. This indication comprises information from which part of a profile that is already installed on the subscriber identity module this marked part of the profile file structure can be copied. The indication can be interpreted by the subscriber identity module and leads the subscriber identity module to the first profile data corresponding to the non-transmitted second profile data.

For example, the marking is an identifier in the second profile file structure, for example, a set flag for a profile file. Each identifier indicates to the subscriber identity module that a first profile file of an already existing (installed) first profile is to be used for this special second profile file.

The second profile data of the second profile file structure are not transmitted along. The second profile is therefore incomplete when received in the subscriber identity module and cannot be used in this incomplete form for authentication/identification on the communication network.

During or with the transmission, the server indicates where the (non-transmitted) missing profile data of the second profile are located on the subscriber identity module. This indication is interpreted by the subscriber identity module to the effect that the indicated first profile data are to be copied and are to be stored in the second file structure as second profile data. After all the first profile data have also been stored in the second profile file structure, the second profile is complete. For example, this indication may be a list of first profile data that is sequentially processed by the subscriber identity module to optionally copy a plurality of first profile data from an existing first (or more) profile(s).

Alternatively or in addition to a list, a rule can also be defined that the missing profile data of the marked part of the second profile file structure are automatically copied from an existing profile, for example the currently activated profile, to complete the second profile.

The copying takes place, for example, during an installation procedure according to the technical specifications [1] and [2] and is implemented by an applet of the subscriber identity module.

If, for example, a first profile is only updated or expanded, it is now possible to use already negotiated identification and authentication data, such as (IMSI, ICCID; Ki, OTA, etc.), also for a second profile, which is extended compared to the first profile. In this way, a second, incomplete profile is first received in the subscriber identity module and is completed by means of a copying and storing function in the eUICC. Elaborate generation of the marked part of the profile data of the second profile file structure can be dispensed with, for example, an already selected OTA key pair can be further used, the negotiated authentication parameters also remain valid for the second profile. Complex adaptations of security areas or applications in the communication network infrastructure can be dispensed with.

The first profile is a profile, which is completely set up on the subscriber identity module. Preferably, it is the activated profile. Alternatively, a data set composed of different set up profiles of the subscriber identity module is combined under the first profile data.

Here, the subscription server constitutes a remote management of the subscriber identity module, in particular according to the definition from the technical specifications [1] and [2].

According to the invention, the subscriber identity module has all access rights required for copying the profile data, particularly, it can access different first profiles of the subscriber identity module for creating the second profile. Corresponding rights rules in technical specifications [1] and [2] may be modified if necessary.

In a preferred embodiment, the method further comprises the steps of: receiving a confirmation from the subscriber identity module that those first profile data have been copied and that the copied first profile data have been stored into the marked part of the second profile file structure of the second subscription profile; and transmitting a profile activating command to the subscriber identity module for activating the second subscription profile. The confirming can be performed by the eUICC, for example, in the context of a "download complete" confirmation in the "download and installation" procedure according to the technical specifications [1] and [2].

The transmission of the profile activating command to the subscriber identity module for activating the second subscription profile preferably causes an automatic deactivation of the first profile. Switching between two profiles is thus performed.

Preferably, the method further comprises transmitting a deleting command to the subscriber identity module for deleting at least the first profile file of the first subscription profile. This ensures that no two profiles with identical safety-relevant profile data are stored on the eUICC. A so-called cloning is thus prevented.

Preferably, the marked part of the second file structure of the second subscription profile is at least one of the following elements: at least one profile elementary file; a subscriber identifier (IMSI); a subscriber identity module identifier (ICCID); an authentication key (Ki); an OTA key; a subscription profile application update; and/or a subscription profile file update.

In a further aspect, the invention relates to a method for managing subscription profiles in a subscriber identity module, preferably an embedded UICC, wherein at least one first subscription profile is installed in the subscriber identity module and wherein the first installed subscription profile comprises a first profile file structure and first profile data stored in the file structure. The following method steps run in the subscriber identity module: receiving a second, incomplete subscription profile from a subscription server while indicating first profile data of the first subscription profile, which are to be copied and to be stored as second profile data in the second profile file structure of the second, incomplete subscription profile; copying the indicated first profile data of the first subscription profile; storing the copied first profile data into the second profile file structure of the second subscription profile to complete the second subscription profile, whereby the second subscription profile is set up; and transmitting a confirmation to the subscription server that the indicated first profile data has been stored in the marked part of the second profile file structure of the second subscription profile.

Copying and storage means both a temporary reproduction and a mere displacement of the corresponding profile data into the second profile file structure.

The copying is performed, for example, in the context of an installation procedure according to the technical specifications [1] and [2], wherein the indication is used when transmitting the second profile to copy the corresponding (missing) second profile data from an already set up profile and to store them in the second profile file structure. For this purpose, the functions "store metadata" etc. can optionally be used in conjunction with the copying of the profile data.

Preferably, the method further comprises receiving a profile activating command from the subscription server for activating the second subscription profile; and activating the second subscription profile while deactivating the first subscription profile.

Preferably, the method further comprises receiving a deleting command from the subscription server for deleting at least the first profile data of the first subscription profile. In this way, the first file structure is retained and can be used for a further (third) profile to be set up. Alternatively, the entire first profile can also be deleted.

Preferably, the copying of the indicated first profile data and the storing of the copied indicated first profile data into the second profile file structure of the second subscription profile are performed without transmitting data, in particular profile data, between the subscriber identity module and the subscription server.

The method steps preferably comprise a creating function ("create profiles") and/or an activation function ("enable profiles") and/or a deactivation function ("disable profiles") according to the technical specifications [1] and [2].

In a further aspect, a subscriber identity module is provided, set up for or comprising a first subscription profile installed in the subscriber identity module, wherein the installed first subscription profile comprises a first profile file structure and first profile data stored in the profile file structure. The subscriber identity module comprises a copying and storing function, which is set up, after receiving a second, incomplete subscription profile from a subscription server while indicating first profile data of the first subscription profile, to copy the indicated first profile data of the first subscription profile into a second profile file structure of a second, incomplete subscription profile to complete the second subscription profile, whereby the second subscription profile is set up in the subscriber identity module.

The copying and storing function is preferably implemented by a functionality of the operating system, which is started after receiving the second, incomplete subscription profile. A functionality of the operating system is preferred since especially sensitive data are stored in encrypted form, and it has advantages, when applets have no access to such data. However, the copying and storing function can alternatively also be implemented by an applet, which is set up to start after receiving the second, incomplete subscription profile, with the disadvantages described above, but with the advantage of greater flexibility. Optionally, the copying and storing function is implemented by a functionality of the operating system, and the functionality (copying and storing function) of the operating system is only triggered by an applet after the reception of the second, incomplete subscription profile is performed; in contrast, the functionality is performed by the operating system and not by the applet.

The subscriber identity module preferably comprises a data memory for storing the subscription profiles; an interface, which is set up for communication with the subscription server, preferably via a terminal, which includes the subscriber identity module; and an interface, which is set up for communication with a network server. In addition, means are provided, which are set up to perform the method described above.

A terminal in the sense of the invention is, in principle, a device or a device component, which includes means for communication with the communication network to be able to use services of the communication network. For example, a mobile terminal, such as a smart phone, a tablet PC, a notebook, a PDA, is included within the term. The terminal can also be understood as meaning, for example, multimedia terminals, such as digital picture frames, audio devices, television sets, e-book readers, which also include means for communication with the communication network. For example, the term terminals also comprises any type of machines, vending machines, vehicles, devices that include means for communication with the communication network, in particular cellular modems.

In a further aspect, a subscription server, preferably an SM-DP, is set up for providing subscription profiles for a subscriber identity module, preferably an eUICC, wherein the subscription server has knowledge of a first subscription profile installed in the subscriber identity module and including a first profile file structure and first profile data stored in the first profile file structure. The server comprises a marking function, which is set up to mark at least part of a second profile file structure of a second subscription profile, and a transmitting function, which is set up to transmit the second, incomplete subscription profile, wherein the marked part of the second subscription profile is transmitted without second profile data, wherein the transmitting function indicates those first profile data of the first subscription profile, which are to be copied, to be stored as second profile data into the marked part of the second profile file structure of the second subscription profile.

The subscription server further comprises a recognizing function, which is set up to recognize the part of the second file structure to be marked, an interface, which is set up for communication with the subscriber identity module, preferably via a terminal, which includes the subscriber identity module; an interface, which is set up for communication with a network server; and means, which are set up to carry out the preceding method.

In addition, a computer program product is provided, which is executable installed in a subscriber identity module and includes means for executing the method steps of one of the preceding methods. The computer program product is preferably a Java Card applet, which is introduced into the eUICC for executing the method steps.

A function is an executable program code, which is installed in the subscriber identity module and can be brought into execution by a command, which corresponds to the function and is transmitted to the subscriber identity module. A function may be part of an applet on the subscriber identity module. Several functions can be called up in succession by an applet.

The copying and storing function or the corresponding copying and storing steps are thus able, without an OTA connection, to apply this first profile data as second profile data within the subscriber identity module by copying the first profile data into a second profile file structure. Thereby, a received incomplete second profile is completed. The conventionally required connection costs for the transmission of the second profile data for the second profile to the subscriber identity module and also the possibly necessary negotiation of new second profile data for the second profile can be omitted. OTA connection costs only occur for a required transmission of the first profile data, which are not already installed in the first profile as second profile data and with which the second profile is completed to be set up.

According to the invention, a subscriber identity module is thus created, which allows subscription profiles to be managed in the subscriber identity module with a smaller amount of data to be transmitted to the subscriber identity module.

For example, the first subscription profile comprises a plurality of profile elementary files as first profile data, wherein one or more profile elementary files of the first subscription profile are copied by means of the copying and storing function.

In the context of storing the first profile data as second profile data in the second file structure, at least one of the profile data can be adapted to the second profile, for example, changed, or, for example, set back to initial values.

For example, the communication takes place by means of SMS, HTTPS, or TCP sessions.

The activating/deactivating of a profile takes place, for example, by means of a proactive command (REFRESH), which is transmitted from the eUICC to the terminal to restart the eUICC.

The transmission of the second profile precedes, for example, a creating command, as described in the GSMA specification.

BRIEF DESCRIPTION OF THE FIGURES

The invention or further embodiments and advantages of the invention will be explained in more detail below with reference to figures, wherein the figures describe only exemplary embodiments of the invention. Identical components in the figures are provided with the same reference signs. The figures are not to be drawn to scale, individual elements of the figures may be illustrated exaggerated in size or exaggerated in simplified form.

DETAILED DESCRIPTION OF EXEMPLARY EMBODIMENTS

Figure 1:
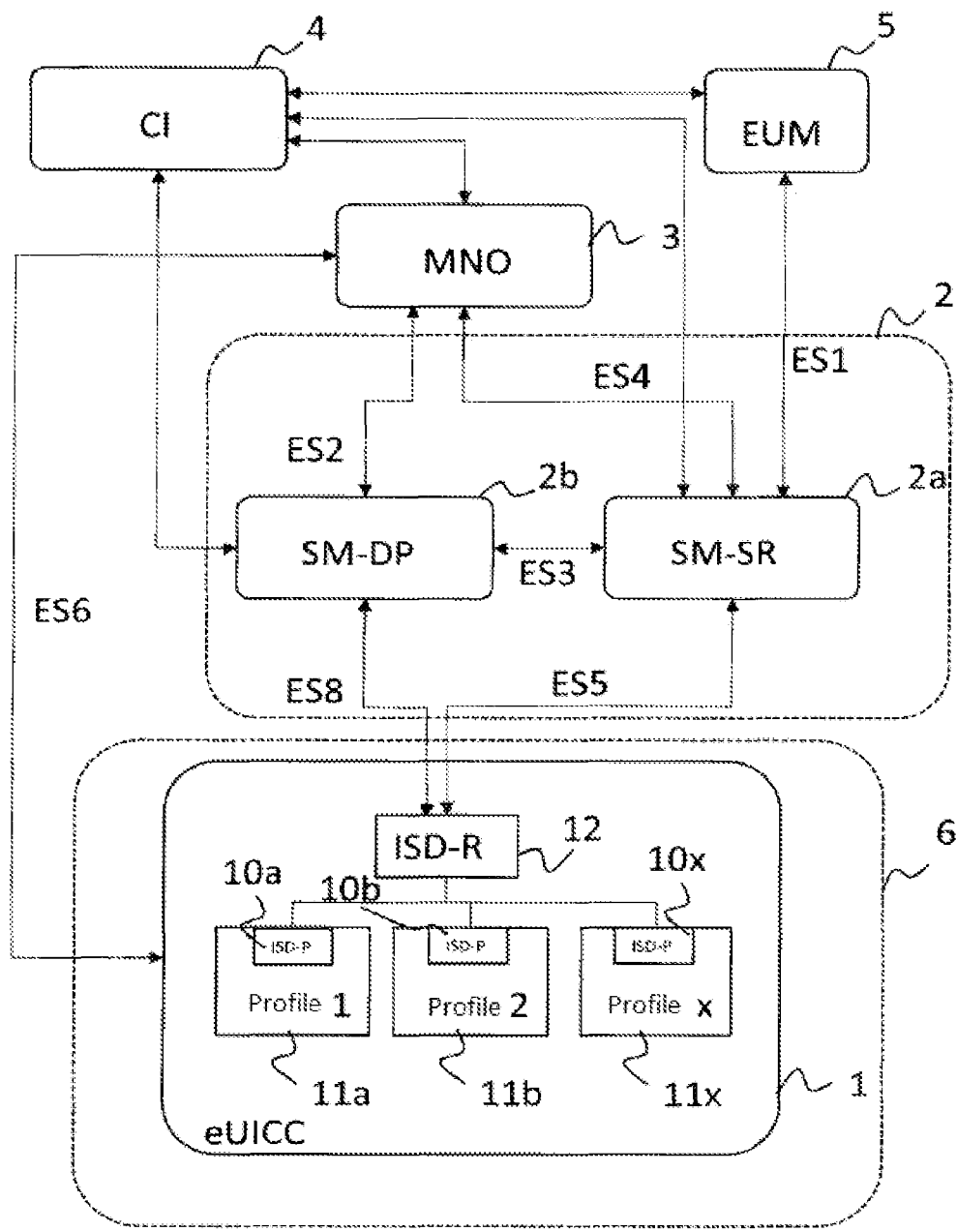
FIG. 1 shows an exemplary embodiment of a system for managing subscriber profiles according to the GSMA specifications [1] and [2]

FIG. 1 shows an exemplary embodiment of a system for managing subscriber profiles 11a, 11b, 11x according to the GSMA specification [1] and [2] mentioned above.

According to FIG. 1, an eUICC 1 is remotely administered by a server 2. In this case, the eUICC 1 is installed in a terminal 6 in a fixed or removable manner. An eUICC 1 of the system in FIG. 1 includes a security domain (=SD) with different privileges and configurations for managing the subscriber profiles 11a, 11b, 11x, such as an ISD-R 12 that is managed by a server component 2a (=Subscription Manager Secure Routing, short SM-SR). An eUICC-controlled security domain, ECASD, may also be included and be managed on the eUICC 1 by a certificate issuer 4 (CI). A file structure of a profile 11a, 11b, 11x is managed by a server component 2b (=the data preparation, Subscription Manager Data Preparation SM-DP). In FIG. 1 three profiles 11a, 11b, 11x are illustrated, each of which has a file structure 10 (=ISD-P) and whose profile data are managed and secured within the file structure 10 by the server 2. The number of profiles 11a, 11b, 11x, which may include the eUICC 1, is not limited to three and may be more or less.

In FIG. 1, the SM-SR 2a and the SM-DP 2b are shown as separate server components of the server 2, but in the following they are considered as a server 2, analogous to the server SM-DP+ according to the specifications [3] and [4].

Only one ISD-R 12 is provided per eUICC 1. The ISD-R 12 can be installed and first personalized by an eUICC manufacturer 5 (EUM) during manufacture of the eUICC 1. After the manufacture of the eUICC 1, the ISD-R 12 is PERSONALIZED in the life cycle state. The ISD-R 12 can then perform subscriber management functions on each ISD-PS 10.

One file structure 10a, 10b, 10x (ISD-P) is provided per profile 11a, 11b, 11x. Only one file structure 10a (ISD-P) is activated at any time on an eUICC 1. A file structure 10a (ISD-P) is installed by the ISD-R 12 and then personalized with the server 2. At least one file structure 10a (ISD-P) with a profile 11a, 11b, 11x may be installed and first personalized by the EUM 5 during manufacture of eUICC 1 to enable future eUICC connectivity.

In addition to the ISD-R 12, there is no component outside the ISD-P 10 that has insight or access to a profile component of the profiles 11a, 11b, 11x. The ISD-R 12 has read only access to connection parameters of the individual profiles 11a, 11b, 11x. No profile component is visible or accessible from components outside the respective profile. By means of the ISD-R 12, it is made possible according to the invention that profile data of a first profile can also be accessed for installing a second profile.

Figure 2:
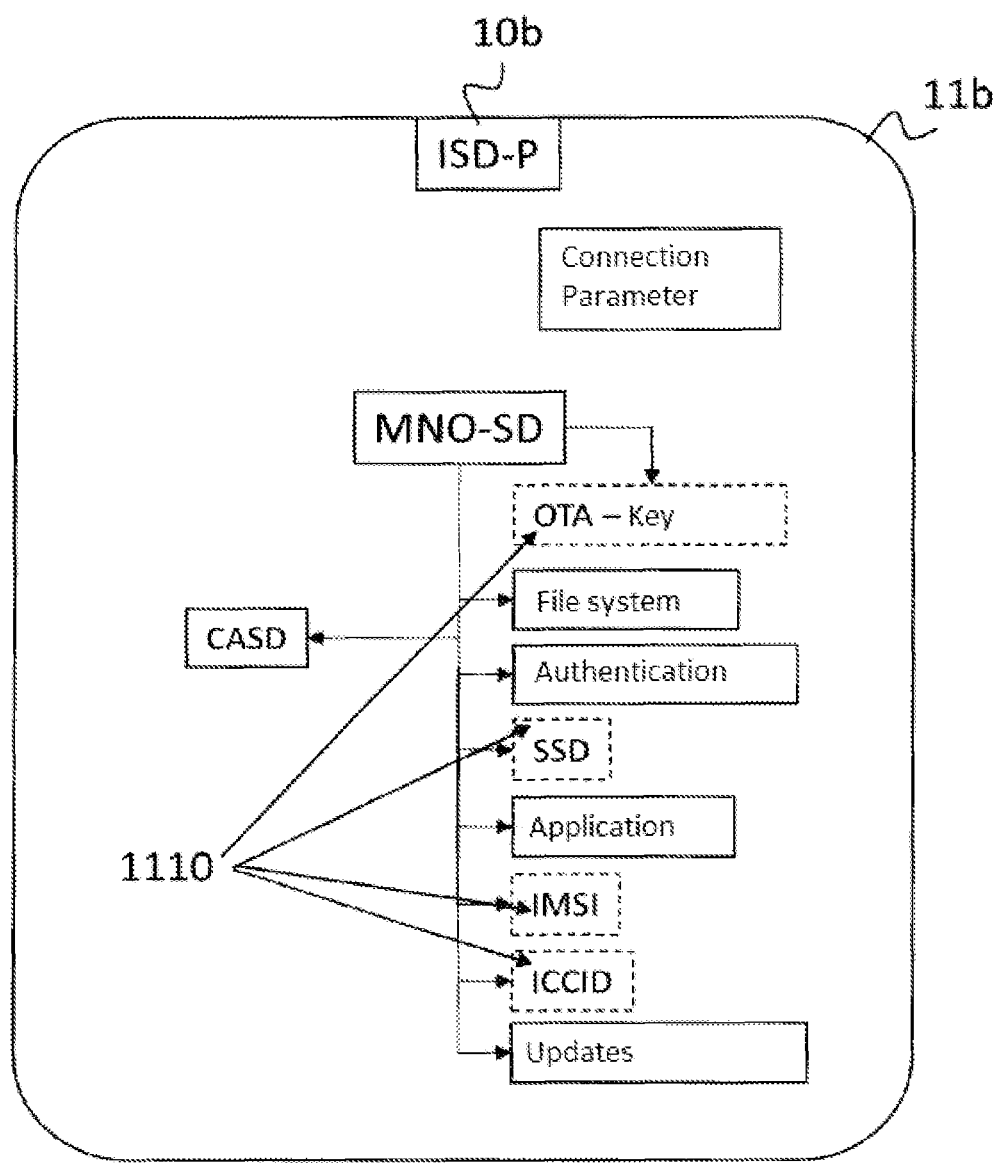
FIG. 2 shows a marking according to the invention of parts of a profile file structure of a profile.

A file structure 10 remains associated with the ISD-R 12 throughout its life so that the ISD-R 12 can perform the following subscriber management functions: profile creation—the association between the ISD-R 12 and a file structure 10 can be created at any time; profile deletion; profile activation; profile deactivation; fall-back position setting; and profile transport function. The structure of the profiles 11a, 11b, 11x is shown in FIG. 2.

In FIG. 1, a plurality of interfaces ESx of the system are provided.

An interface ES8 addresses functions to the eUICC 1 via a secure channel set up between the SM-DP 2b and the file structure 10 of a profile 11. To enable this in a secure form, the profile 11 is personalized with at least one key set. The ES8 interface is realized by a secure channel set up between the SM-DP 2b and the SM-SR 2a (=ES3 interface), and further by a secure channel SCP80 or SCP81 between the SM-SR 2a via which the ISD-R 12 can be tunnelled up to the ISD-P of the affected profiles 11 (profile1 11a, profil2 11b . . . or profilex 11x). The communication is then decrypted by the ISD-P 10 (10a, 10b . . . 10x) and transferred to the respective profile 11 (11a, 11b . . . 11x).

The interface ES6 addresses functions to the eUICC 1 via a secure channel set up between a Mobile Network Operator (MNO) 3 and an MNO security domain, which is included in each ISD-P 10. The eUICC 1 supports ports SCP80 and SCP81 according to the definition in ETSI 102 225 and ETSI 102 226 for this E6 interface. The initial OTA key sets are part of each profile 11a, 11b, 11x and are loaded by the SM-DP 2b during a profile download and installation operation or are loaded by the EUM 5 before eUICC 1 is output.

The interface ES5 addresses functions to the eUICC 1 via a secure channel set up between the SM-SR 2a and the ISD-R 12. The eUICC 1 supports SCP80 and SCP81 according to the definition in ETSI 102 225 and ETSI 102 226 for this E5 interface. To activate SCP80/SCP81, the ISD-R 12 is personalized with corresponding key sets prior to output by the EUM 5. The key sets are loaded into the ISD-R 12 via the SM-SR 2a; for example, by means of interface ES1.

In the system of FIG. 1, the OTA communication is taken over exclusively by the SM-SR 2a. The SM-SR 2a uses, for example, SMS, CAT_TP or HTTPS for the Over The Air, OTA, communication with the eUICC 1. When using HTTPS, SM-SR 2a and eUICC 1 support a domain name resolution to be able to resolve an IP address of the SM-SR 2a. In long term evolution networks, the system of FIG. 1 also supports short messages (=Short Message Service, SMS). The SM-SR 2a is free in the selection of the transmission protocol according to the capabilities of the eUICC 1, the terminal 6 and the executing server 2. The eUICC 1 supports the shipping of secure data packets via SMS according to 3 GPP TS 31.115.

According to the technical specification [1], chapter 3.3.1.2.2 "Profile Download and Installation Function", a profile is loaded into an eUICC 1 with a "download" function. However, further, accompanying functions are to be performed via "download". According to the technical specification [1], chapter 3.3.1.3.1 "ISD-P Creation Function" and the technical specification [2], chapter 3.1.1 "ISD-P Creation", "Create" functions are required to create a file structure 10, in particular the ISD-P, in the eUICC 1.

According to the technical specification [2], chapter 3.1.3 "Download an Installation of the Profile", after application of the ISD-P, a profile is downloaded and stored in the file structure, in particular the ISD-P. According to the technical specification [1], chapter 3.3.1.2.3 "Profile Content Update Function" and chapter 3.3.1.2.4 "Policy Rules Update Function", "Update" functions are used to make updates corresponding to the newly downloaded profile. According to the technical specification [1], chapter 3.3.1.3.4 "Profile Enabling Function" and the technical specification [2], chapter 3.2 "Profile Enabling", "Enable" functions are performed to activate a downloaded profile, in particular an ISD-P, and thereby to make it usable for the user of the eUICC 1.

Thus, according to the technical specifications [1] and [2], in addition to the "download" function, at least the three additional functions "create", "update" and "enable" are to be used, which cause a solid overhead. Each of these functions must be called up or transmitted in a cost-causing manner via an Over The Air, OTA, connection from the server 2 to the eUICC 1. For example, for downloading ten kilobytes of profile data into an eUICC 1, at least about 20 kilobytes (i.e., approximately twice as many) of data must be transmitted via OTA from the server 2 to the eUICC 1.

FIG. 2 shows a marking according to the invention of parts 1110 of a second profile file structure 10b of a second profile 11b of FIG. 1. The file structure 11b includes profile data. For example, one of the following components can be included as a profile file in the file structure 11b: an MNO security domain (MNO-SD) with the OTA key sets of the MNO server 3; at least one authentication parameter (Ki), a network access application, policy rules, a file system containing folder (DF) and elementary files (EF); connection parameters of the profile, applications; a subscriber identifier, IMSI, a subscriber identity module identifier ICCID, profile updates.

According to the invention, parts 1110 of the profile data 10b of the file structure 10b of the profile 11b are marked. These marked parts 1110 are shown in dashed lines in FIG. 2. The marking takes place in the server 2, preferably in the SM-DP 2b, timely before the profile 11b is loaded into the eUICC 1. According to FIG. 2, the marked parts 1110 of the profile 11b are an OTA key, an SSD, an IMSI, and an ICCID. These marked parts 1110 are not present in the second profile 11b when the second profile 11b is transmitted from the server 2 to the eUICC 1. Thus, this marked part 1110 is a placeholder for first profile data of another profile 11a, 11x—installed on the eUICC 1. The marked part 1110 may refer to only one profile file or also to the entire file structure 10b. The amount of profile data in the marked part 1110 is not limited.

When a profile 11b is received from the eUICC 1, profile data from another profile 11a, 11x of the eUICC 1 is indicated. These indicated profile data are copied and stored in corresponding regions of the marked part 1110 of the second profile 11b. Once all profile data are stored in the marked part 1110, the second profile 11b is considered to be completely set up. Therefore, when received in the eUICC 1, the marked part 1110 represents gaps in the incomplete profile 11b, into which a corresponding profile file of another profile 11a, 11x is to be stored.

In this way, an incomplete profile is loaded, which is completed by marking and indicating the profile data of other profiles on the eUICC 1 by the eUICC 1 using profile data of the eUICC 1. The corresponding method for this purpose is described in the following FIGS. 3 to 5.

Figure 3:
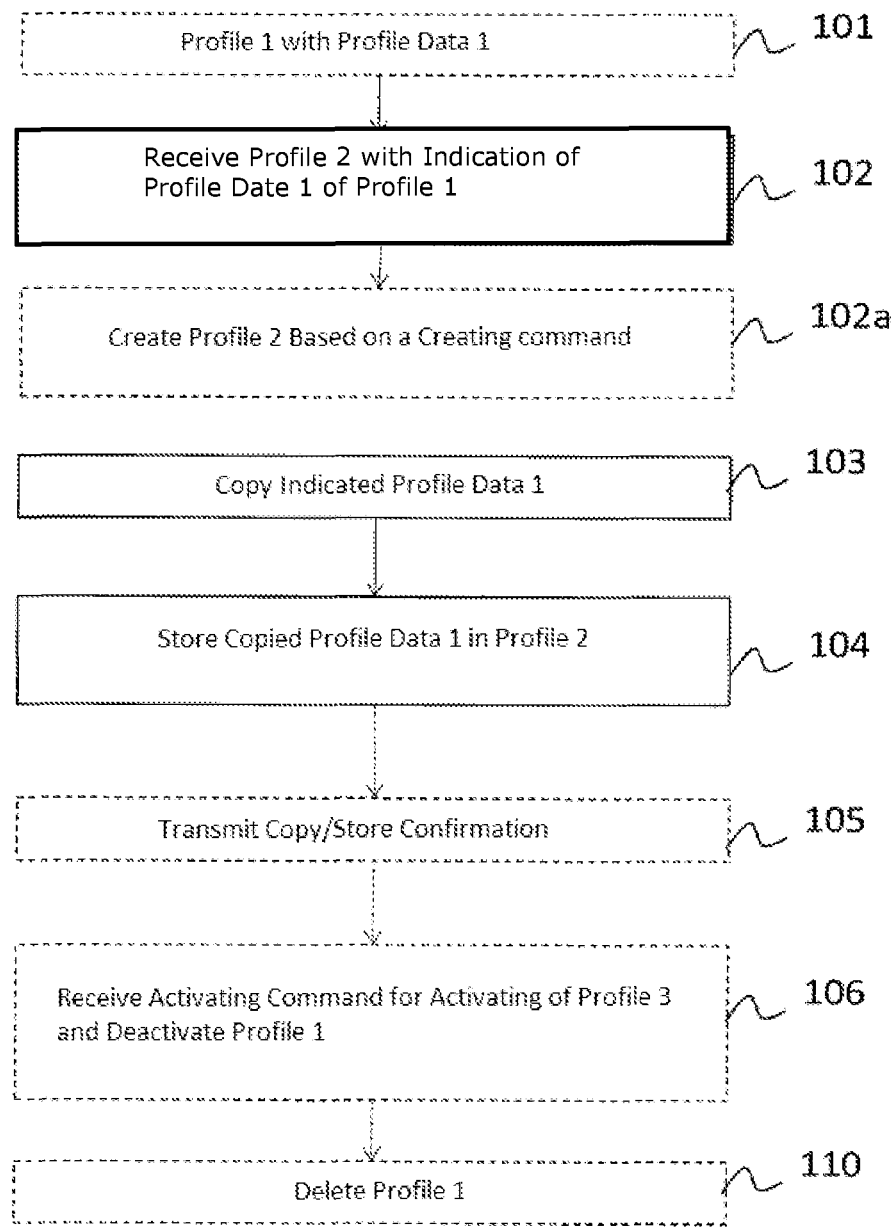
FIG. 3 shows an exemplary embodiment of a flowchart of a method according to the invention in a subscriber identity module.

FIG. 3 shows an exemplary embodiment of a flowchart of a method 100 according to the invention in a subscriber identity module 1, in the following referred to as eUICC 1.

An optional step 101 illustrates that the eUICC 1 includes a first profile 11a with first profile data within a first file structure 10a. The eUICC 1 receives a second profile 11b in step 102. In addition, in step 102, the eUICC 1 receives indications of profile data from the first profile 11a, which are to be used to complete the second profile 11b. In the optional step 102a, a second profile file structure 10b for a second profile 11b is built up for this purpose by means of a creating command from a server 2, for example a "creating command" of the technical specifications [1] and [2].

After receiving the second profile 11b, the eUICC 1 copies in step 103 the indicated profile data of the first profile 1a by means of a copying function in the eUICC 1. After the copying step 103, a storing step 104 is performed in the eUICC 1 to place the copied profile data of the first profile 11a at the respective location of the second profile 11b in the eUICC 1. With reference to FIG. 2 the OTA key of the first profile 11a will also be stored as an OTA key in the second profile after step 104. Furthermore, the IMSI of the first profile 11a will also deposited as IMSI in the second profile. Furthermore, the ICCID of the first profile 11a can also be stored as an ICCID in the second profile. Furthermore, the SSD of the first profile 11a will also be stored as an SSD in the second profile.

A rule, which profile data from which profile 11 is to be stored to which location of the second profile 11b is understood as the indicating of the profile data according to the invention. In this case, a list with the profile data to be copied can be transmitted along. The corresponding marking of the second file structure 10b of the second profile 11b can be implemented by means of a set flag. Alternatively, non-existing second profile data (i.e., placeholder) in a file structure 10b of the second profile 11b are interpreted as a marking.

At the end of step 104, a complete second profile 11b is obtained in the eUICC 1, wherein a part of the profile data of the second profile 11b were not transmitted by the server 2 when the second profile 11b was transmitted.

In the optional step 105, the successful copying and storing is confirmed to the server 2. This indicates to the server 2 that a complete second profile 11b is now present in the eUICC 1, which can be treated according to the current methods of technical specifications [1] and [2]. By way of example only, in step 106 an activating command is received, with the aid of which the second profile 11b is activated and used from now on to use services in the communication network of the MNO server 3 of FIG. 1. In an optional step 110, the first profile 11a in the eUICC 1 is deleted to ensure that no two profiles with the same subscriber identity data (IMSI, ICCID, OTA key, etc.) are stored in the eUICC 1.

Figure 4:
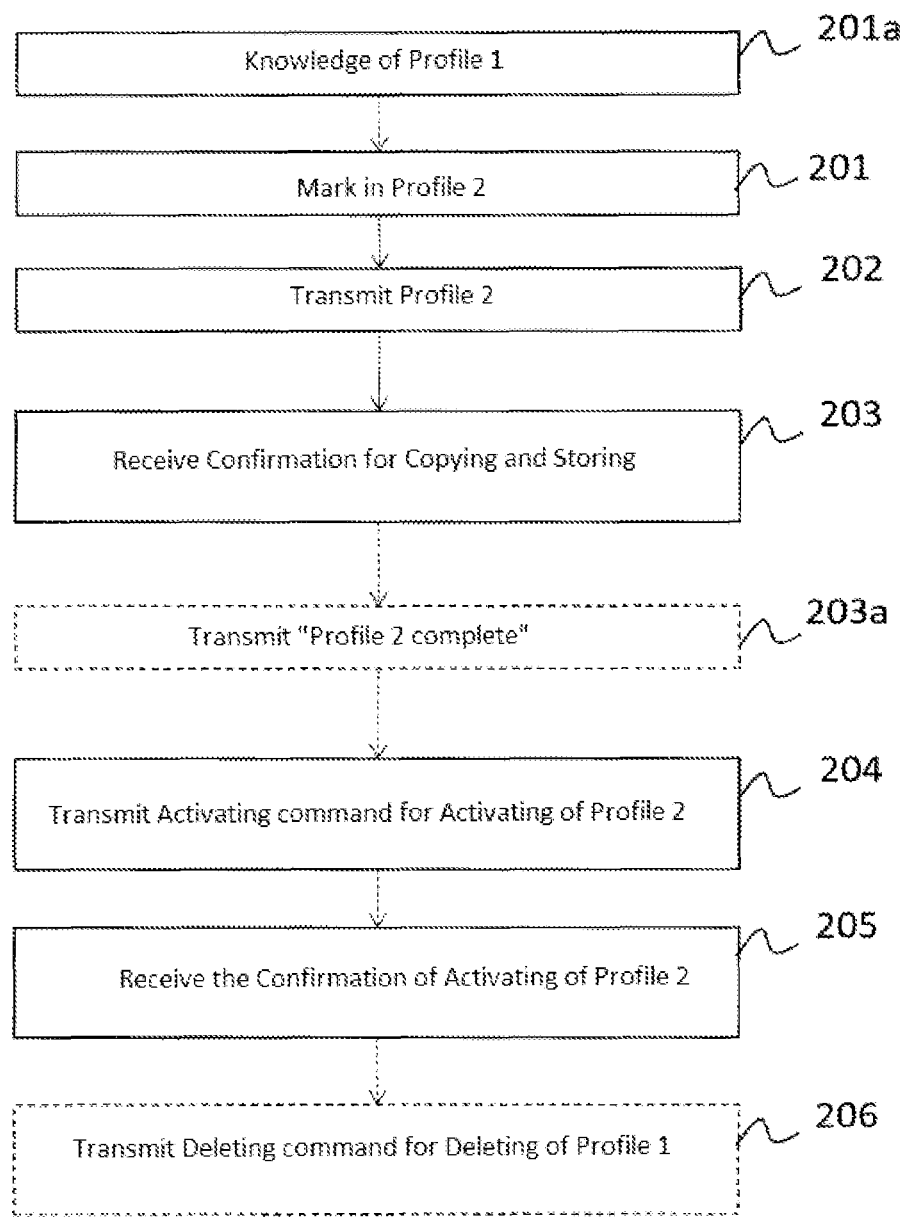
FIG. 4 shows an exemplary embodiment of a flowchart of a method according to the invention in a subscription server.

FIG. 4 shows an exemplary embodiment of a flowchart of a method 200 according to the invention in a subscription server 2. In a step 201a, the server 2 has knowledge of the profiles 11 located in the eUICC 1 and, thus, also has knowledge of the first profile file structure 10a and the first profile data of the first profile 11a.

In a second profile 11b to be loaded, at least a part 1110 of the second file structure 10b of the second profile 11b is marked according to step 201. The result of such a marking 1110 according to step 201 is shown in FIG. 2, where the marked part 1110 of the profile file structure 10b is shown in dashed lines. In step 202, the second profile 11b is transmitted to the eUICC 1, wherein the profile data of the marked part 1110 of the second file structure 10b are not being transmitted. On the contrary, an indication, which profile data from a present profile 11 of the eUICC 1 are to be copied and to be stored into the marked part 1110, is transmitted along. The data set to be transmitted—which represents the second profile 11b—is thus reduced.

In step 203, confirmation of a successful copying and storing operation (steps 103, 104 of FIG. 3) is obtained. Thus, it has been signalled to the server 2 that the second profile 11b is completely present in the eUICC 1. In step 203a, it is transmitted to the MNO server 3 that the second profile 2 is complete and a corresponding activation of the second profile 11b can now take place at any time.

In step 204, the server 2 transmits an activating command to the eUICC 1 for activating the second profile 11b while simultaneously deactivating of the first profile 11a. Thereupon, in step 205, the server 2 receives a confirmation of the successful activation by the eUICC 1. In step 206, a deleting command is optionally transmitted to the eUICC 1 for deleting the first profile 11a.

Figure 5:
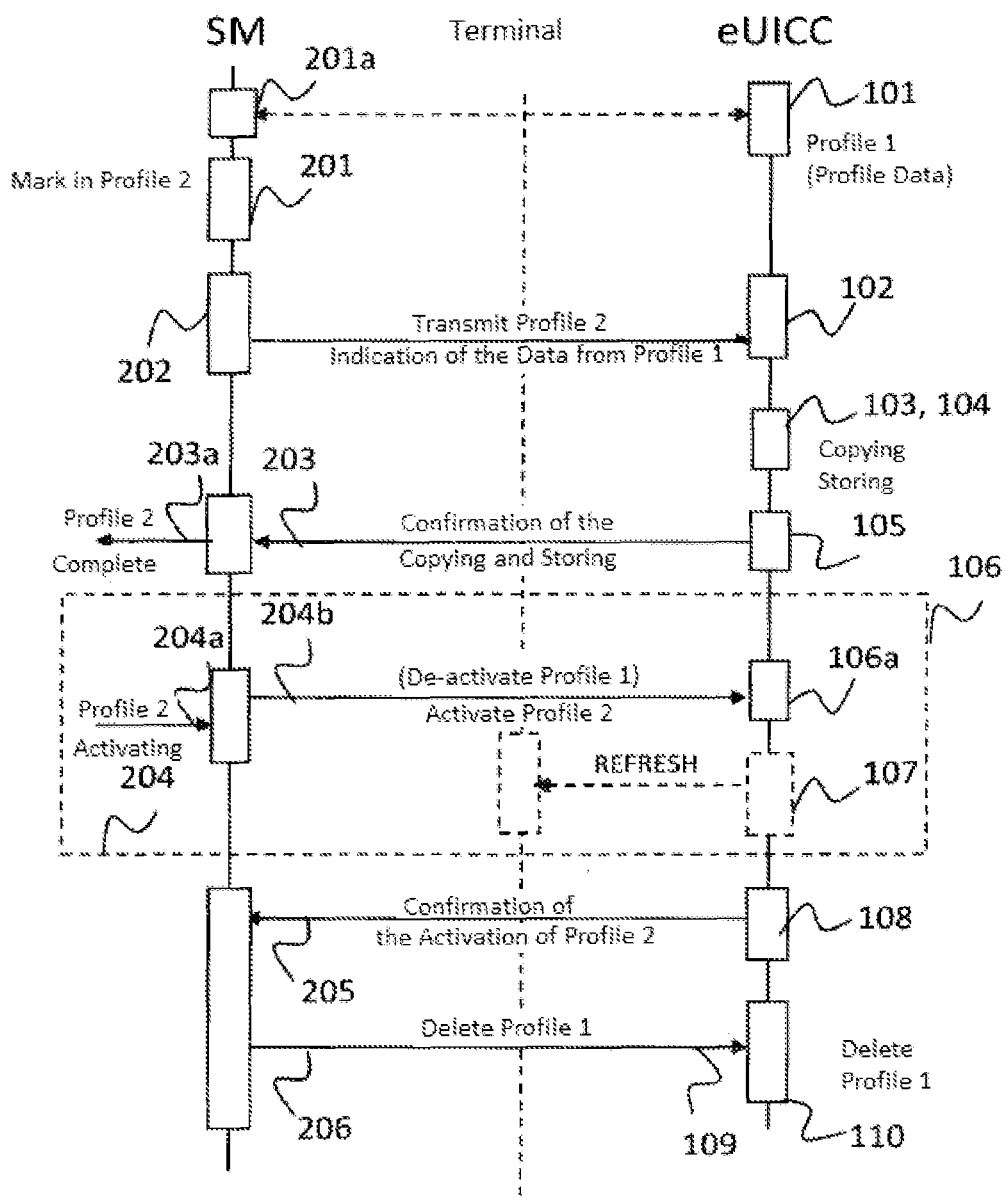
FIG. 5 shows an exemplary embodiment of a flowchart of a method according to the invention between a subscriber identity module and a subscription server.

In FIG. 5 an exemplary embodiment of a flowchart of a method according to the invention between a subscriber identity module 1 and a subscription server 2 is shown. FIG. 5 combines the two methods 100 and 200 from FIGS. 3 and 4 described above.

The starting point of the invention is the presence of a first profile 11a with a first file structure 10a and first profile data in an eUICC 1. This presence and also the content of the first profile 11a is known to the server 2, see step 201a. In step 201, a second profile 11b, which is different from the first profile 11a, is marked, see explanations with respect to FIG. 2. In step 202, the server transmits the second profile 11b with the marked file structure to the eUICC 1 via the interface ES5 or ES8, while indicating the profile data of the first profile 11a. After receipt in step 102, the eUICC 1 copies the profile data of the first profile 11a in step 103 and stores them accordingly in the file structure 10b of the second profile 11b in step 104. The eUICC 1 confirms successful copying and storing in step 105 (step 203) to the server 2 via the interfaces ES5 or ES8 as an indication of completion of the second profile 11b. In step 203a, this completion is indicated to an MNO server 3 via interfaces ES2 or ES4. In step 204, the activating of the second profile 11b takes place. For this purpose, in step 204a, the server 2 receives an activation request from the MNO server 3 via the interfaces ES2 or ES4. Then, in step 204b, an activation command is transmitted to the eUICC 1. In step 106a, the second profile 11b is activated and (thus simultaneously) the first profile 11a is deactivated. Within the scope of the activation, a REFRESH proactive command is transmitted to the terminal 6 in step 107 to restart the eUICC. Then, in step 108, the activation is confirmed to the server 2. After receipt 205 of the confirmation, a deleting command is transmitted from the server 2 to the eUICC 1 via the interfaces ES5 or ES8 in step 206 to delete the first profile 11a or to delete at least the profile data of the first profile 11a. This is performed by the eUICC 1 in step 110. The deleting ensures that no two identical profile data are present in one eUICC 1.

Thus, two profiles 11a, 11b can be defined within the eUICC 1 without the corresponding safety parameters (IMSI, ICCID, OTA, Ki, etc.) having to be cloned on the server side. This copying in step 103 and storing in step 104 in the eUICC 1 is made possible since the eUICC 1 as a security element is classified as trustworthy for this data and, thus, no server-side security needs to be guaranteed.

In this way, an initial first profile 11a comprising less profile data can be replaced by a later second profile 11b including more profile data and, thus, more functionality, without any existing profile data having to be re-transmitted or having to be generated in a complex manner due to the complexity of the system according to FIG. 1. Thus, it is possible to achieve more functionality without generating and transmitting a completely new profile 11. This saves time and network load.

Within the scope of the invention, all described and/or illustrated and/or claimed elements can be combined with one another as desired.

The invention claimed is:

1. A method for providing subscription profiles to a subscriber identity module by means of a subscription server,
    wherein the subscription server has knowledge of a first subscription profile installed in the subscriber identity module and including a first profile file structure and first profile data stored in the first profile file structure,
    wherein the following method steps run in the subscription server:
    marking at least a part of a second profile file structure of a second subscription profile; and
    transmitting the second subscription profile to the subscriber identity module,
    wherein the marked part of the second subscription profile is transmitted without second profile data,
    wherein in the transmitting step those first profile data of the first subscription profile, which are to be copied, are indicated to be stored as second profile data into the marked part of the second profile file structure of the second subscription profile.

2. The method according to claim 1, wherein the method further comprises:
    receiving a confirmation from the subscriber identity module that those first profile data have been copied and that the copied first profile data have been stored into the marked part of the second profile file structure of the second subscription profile;
    transmitting a profile activating command to the subscriber identity module for activating the second subscription profile.

3. The method according to claim 1, wherein the method further comprises:
    transmitting a deleting command to the subscriber identity module for deleting at least the first profile data of the first subscription profile.

4. The method according to claim 1, wherein the marked part of the second subscription profile includes at least one of the following elements:
- at least one profile elementary file;
- a subscriber identifier;
- a subscriber identity module identifier;
- an authentication key;
- an OTA key;
- a subscription profile application update; and/or
- a subscription profile file update.

5. The method according to claim 1, wherein the method steps comprise a creating function and/or an activating function and/or a deactivating function according to the technical specification SGP02 remote provisioning architecture for-embedded UICC, version 2.0.

6. A method for managing subscription profiles in a subscriber identity module,
- wherein at least one first subscription profile is installed in the subscriber identity module and
- wherein the first installed subscription profile comprises a first profile file structure and first profile data stored in the file structure,
- wherein the following method steps run in the subscriber identity module:
- receiving a second subscription profile including at least partially marked second profile data structure from a subscription server while indicating first profile data of the first subscription profile, which are to be copied and to be stored as second profile data in the second profile file structure of the second subscription profile,
- wherein the marked part of the second profile data structure of the second subscription profile has been transmitted from the subscription server without second profile data;
- copying the indicated first profile data of the first subscription profile;
- storing the copied indicated first profile data into the marked part of the second profile file structure of the second subscription profile to complete the second subscription profile,
- wherein the second subscription profile is set up.

7. The method according to claim 6, wherein the method further comprises:
- transmitting a confirmation to the subscription server that the indicated first profile data have been stored into the marked part of the second profile file structure of the second subscription profile,
- receiving a profile activating command from the subscription server for activating the second subscription profile; and
- activating the second subscription profile while deactivating the first subscription profile.

8. The method according to claim 7, wherein the method further comprises:
- receiving a deleting command from the subscription server for deleting at least the first profile data of the first subscription profile.

9. The method according to claim 6, wherein the copying of the indicated first profile data and the storing of the copied indicated first profile data into the second profile file structure of the second subscription profile are performed without transmitting data, in particular profile data, between the subscriber identity module and the subscription server.

10. A computer program product, executable installed in a subscriber identity module that executes the method steps according to claim 6, when the computer program product is executed on the subscriber identity module.

11. A subscriber identity module, set up for or comprising a first subscription profile installed in the subscriber identity module,
- wherein the installed first subscription profile comprises a first profile file structure and first profile data stored in the file structure,
- wherein a copying and storing function, which is set up, after receiving a second subscription profile including at least partially marked second profile data structure from a subscription server while indicating first profile data of the first subscription profile,
- wherein the marked part of the second profile data structure of the second subscription profile has been transmitted from the subscription server without second profile data, to copy the indicated first profile data of the first subscription profile into the marked part of the second profile file structure of the second subscription profile to complete the second subscription profile,
- wherein the second subscription profile is set up in the subscriber identity module.

12. The subscriber identity module according to claim 11, wherein the copying and storing function is implemented by a functionality of the operating system, or, alternatively, by an applet, which is set up to start after receiving the second subscription profile.

13. The subscriber identity module according to claim 11, further comprising:
- a data memory for storing the subscription profiles,
- an interface, which is set up for communication with the subscription server;
- an interface, which is set up for communication with a network server; and
- means, which are set up to perform a method for managing subscription profiles in a subscriber identity module,
- wherein at least one first subscription profile is installed in the subscriber identity module and
- wherein the first installed subscription profile comprises a first profile file structure and first profile data stored in the file structure,
- wherein the following method steps run in the subscriber identity module:
- receiving a second subscription profile including at least partially marked second profile data structure from a subscription server while indicating first profile data of the first subscription profile, which are to be copied and to be stored as second profile data in the second profile file structure of the second subscription profile,
- wherein the marked part of the second profile data structure of the second subscription profile has been transmitted from the subscription server without second profile data;
- copying the indicated first profile data of the first subscription profile;
- storing the copied indicated first profile data into the marked part of the second profile file structure of the second subscription profile to complete the second subscription profile,
- wherein the second subscription profile is set up.

14. A subscription server, set up for providing subscription profiles to a subscriber identity module,
- wherein the subscription server has knowledge of a first subscription profile installed in the subscriber identity module and including a first profile file structure and first profile data stored in the first profile file structure, wherein a marking function, which is set up to mark at least a part of a second profile file structure of a second subscription profile;

a transmitting function, which is set up to transmit the second subscription profile, wherein the marked part of the second subscription profile is transmitted without second profile data, wherein the transmitting function indicates those first profile data of the first subscription profile, which are to be copied, to be stored as second profile data into the marked part of the second profile file structure of the second subscription profile.

15. The subscription server according to claim 14, further comprising:

a recognizing function, which is set up to recognize the part of the second file structure to be marked, an interface, which is set up for communication with the subscriber identity module;

an interface, which is set up for communication with a network server;

means, which are set up to perform a method for providing subscription profiles to a subscriber identity module by means of a subscription server, wherein the subscription server has knowledge of a first subscription profile installed in the subscriber identity module and including a first profile file structure and first profile data stored in the first profile file structure, wherein the following method steps run in the subscription server:

marking at least a part of a second profile file structure of a second subscription profile; and transmitting the second subscription profile to the subscriber identity module, wherein the marked part of the second subscription profile is transmitted without second profile data, wherein in the transmitting step those first profile data of the first subscription profile, which are to be copied, are indicated to be stored as second profile data into the marked part of the second profile file structure of the second subscription profile.

\* \* \* \* \*